Jan. 12, 1937  F. E. MIICK  2,067,277
SCUM COLLECTOR
Filed Aug. 19, 1935  3 Sheets-Sheet 1

Inventor
Fred E Miick
by Parker & Carter
Attorneys

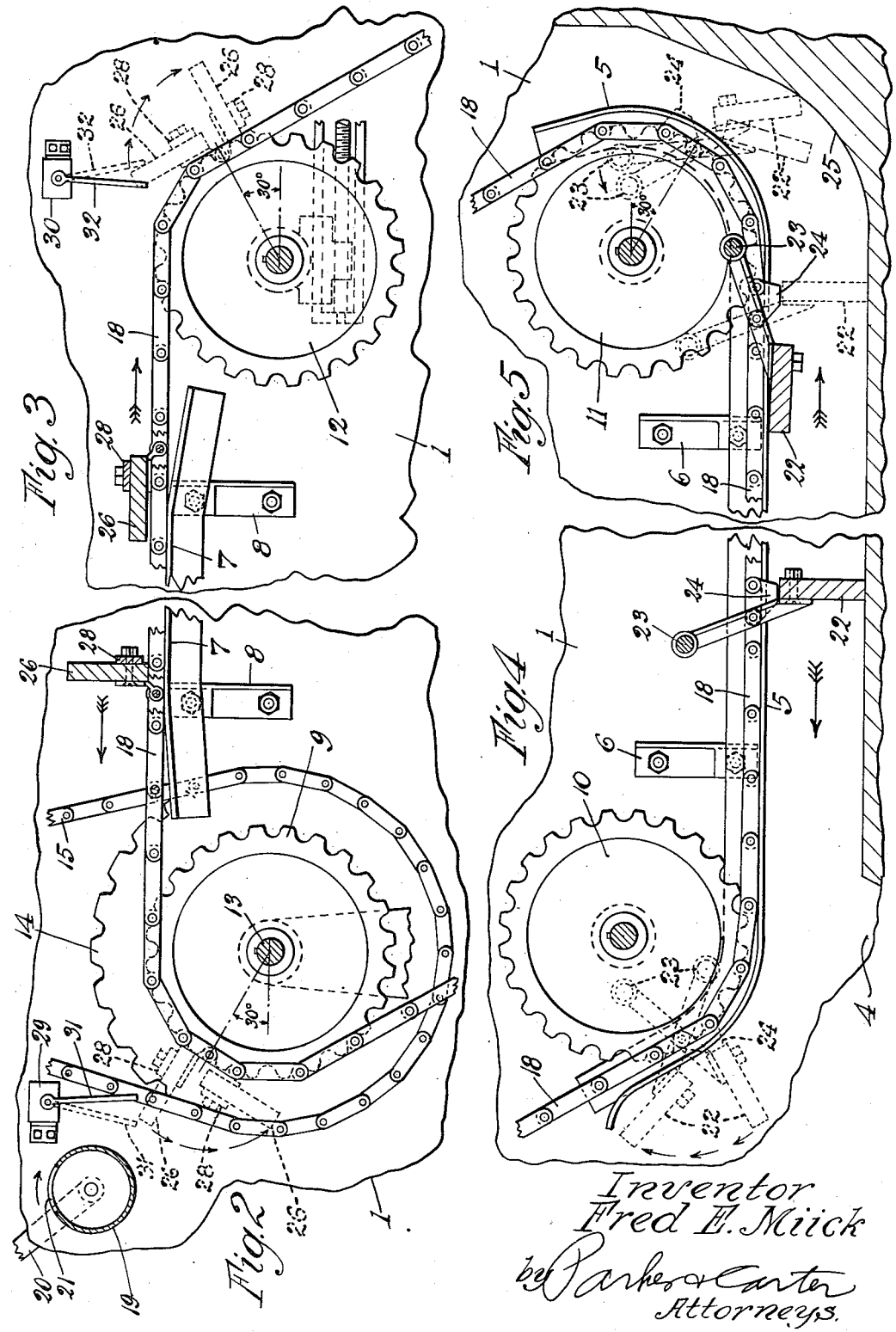

Jan. 12, 1937. F. E. MIICK 2,067,277
SCUM COLLECTOR
Filed Aug. 19, 1935 3 Sheets-Sheet 3
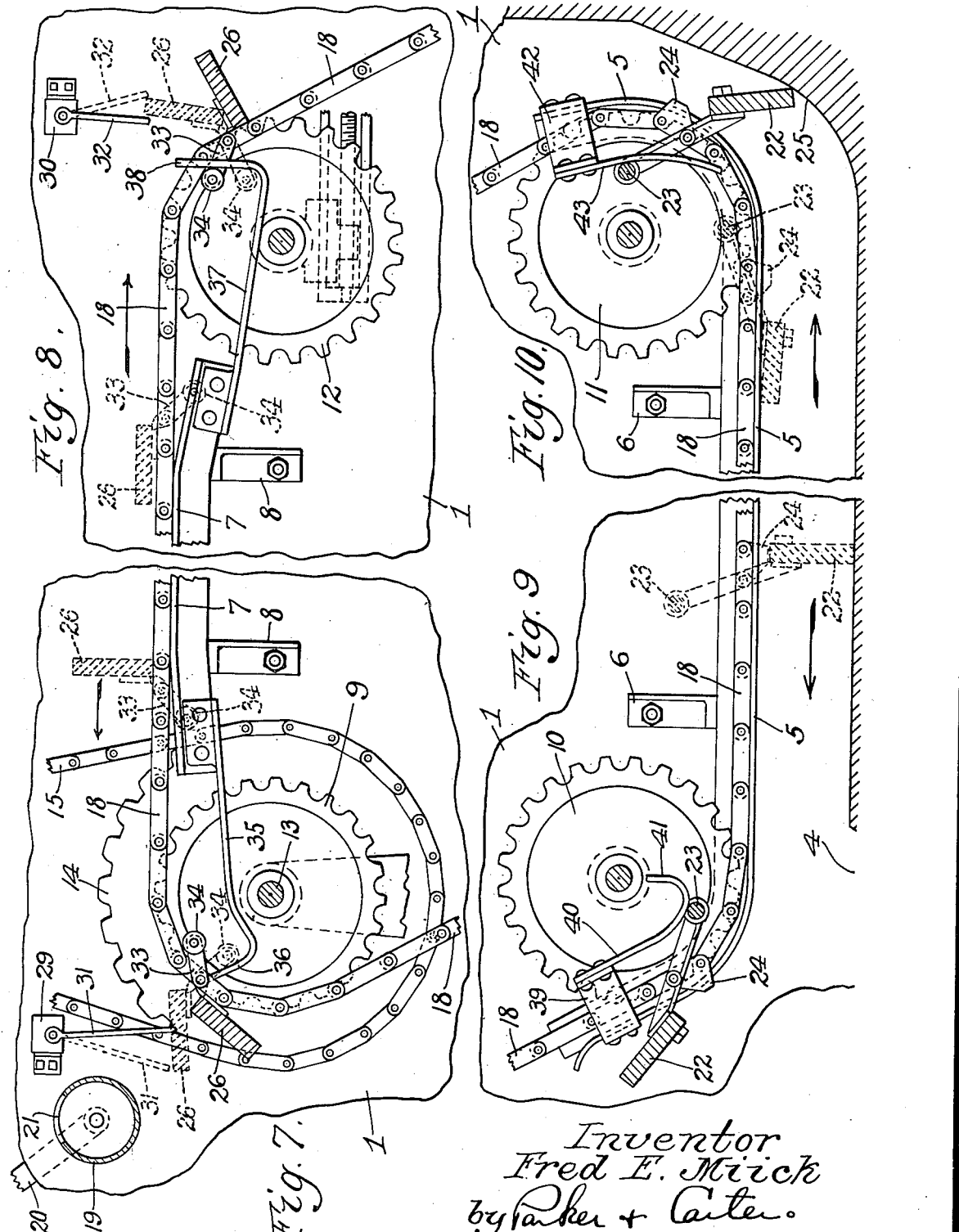
Inventor
Fred E. Miick
by Parker + Carter
Attorneys.

Patented Jan. 12, 1937

2,067,277

UNITED STATES PATENT OFFICE 2,067,277

SCUM COLLECTOR

Fred E. Miick, Los Angeles, Calif., assignor to Link-Belt Company, Chicago, Ill., a corporation of Illinois Application August 19, 1935, Serial No. 36,875

15 Claims. (Cl. 210—55)

My invention relates to improvements in scum and sludge collectors for sedimentation tanks and the like and has for one object to provide apparatus adaptable primarily though not essentially for use with rectangular tanks whereby sludge and scum may both be collected and discharged at the same end of the tank.

One object of my invention is to provide a simple, cheap and inexpensive apparatus for collecting the scum and sludge and discharging them at the same end of the tank.

Another object of the invention is to provide automatic means so that conveyor flights may be caused to feather when the chain travels in reverse direction.

Another object of the invention is to provide in a sedimentation tank, a single combined sludge and scum conveyor with feathering flight whereby when the chain travels in one direction, the scum is collected, while the feathering flight associated with sludge is inoperative and when the chain travels in the opposite direction sludge is collected while the feathering flight associated with the scum is inoperative.

Another object is to provide automatic gravitally controlled feathering conveyor flights which will operate without the interposition of cams, levers, or operating means, being caused to move from operative to inoperative position entirely by the force of gravity.

Other objects will appear from time to time throughout the specification and claims.

The invention is illustrated more or less diagrammatically in the accompanying drawings, wherein—

Figure 2 is an enlarged vertical section showing the scum collecting part of the apparatus adjacent the influent channel in detail;

Figure 3 is a similar section of the scum collecting part of the apparatus adjacent the effluent channel;

Figure 4 is an enlarged vertical section of the sludge collecting part adjacent the sludge hopper;

Figure 5 is a similar section of the sludge collecting part at the opposite end;

Fig. 7 is similar to Fig. 2, showing a modified form;

Fig. 8 is similar to Fig. 3, showing the modified form;

Fig. 9 is similar to Fig. 4, showing the modified form; and

Fig. 10 is similar to Fig. 5, showing the modified form.

Like parts are indicated by like characters throughout the specification and drawings.

Figure 1:
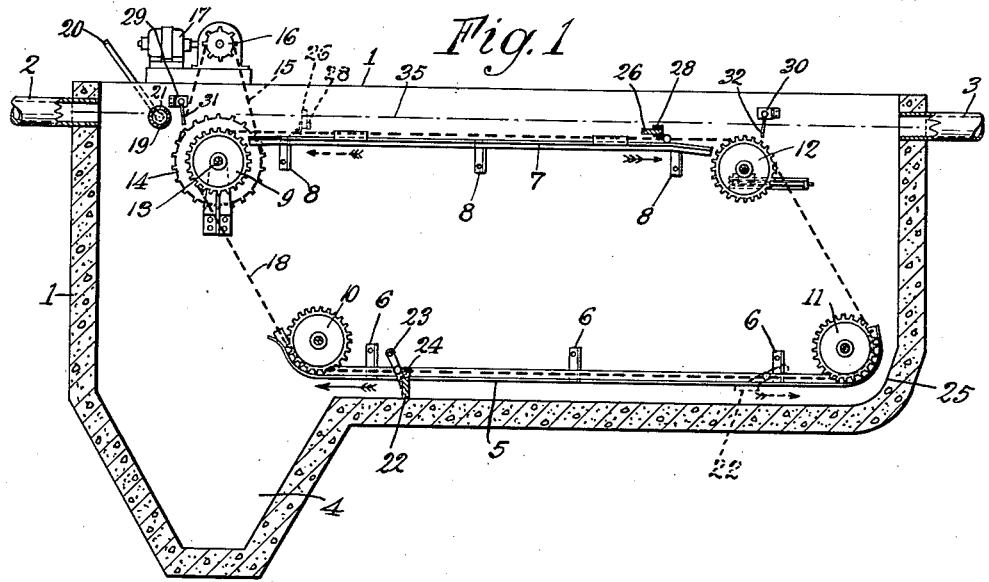
Figure 1 is a diagrammatical diagram showing the relative position of tank and conveyor.
Figure 6:
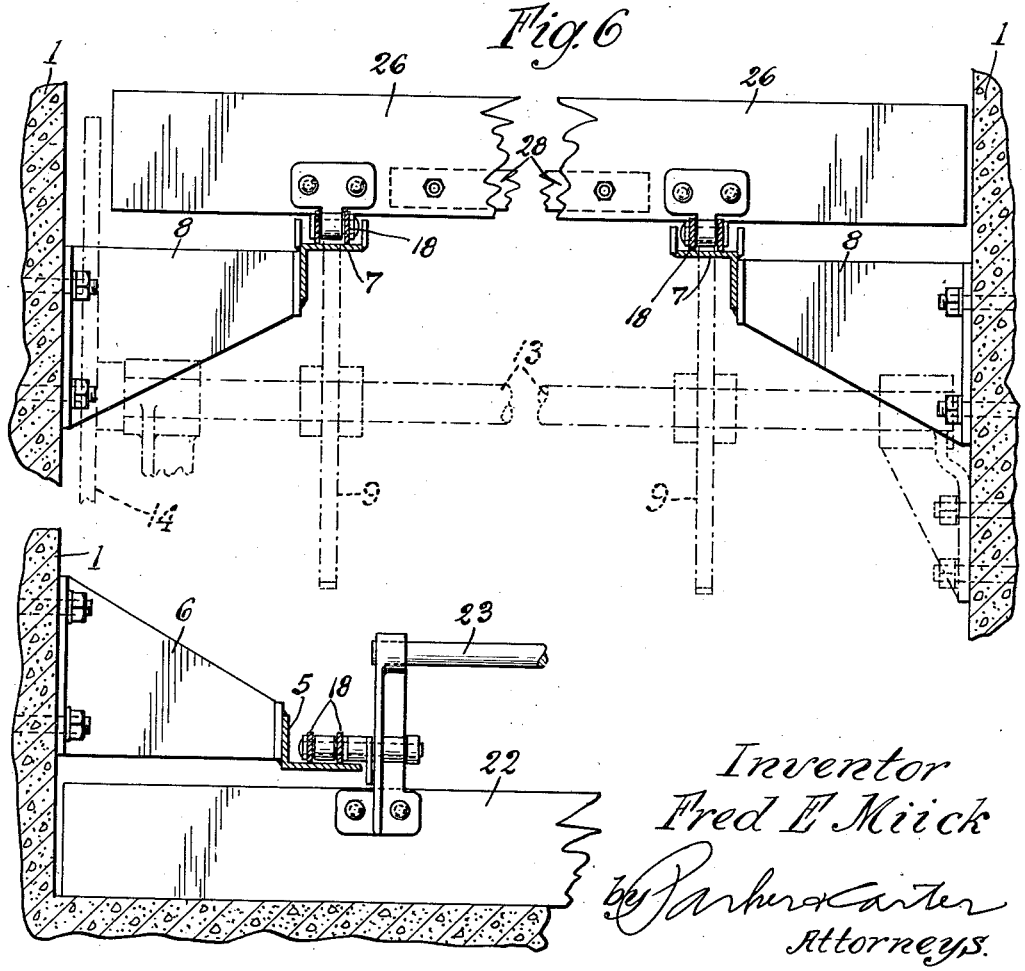
Figure 6 is a transverse section through a part of the tank showing the details of the chain and flights.

1 is a sedimentation tank; 2 is the influent channel; 3 is the effluent channel, and 4 the sludge hopper. 5 is a sludge scraper track raised above the bottom floor of the tank, there being one on each side of the tank. 6 are brackets to support the track. 7 is a scum scraper track located below the normal liquid level of the tank, there being one on each side and 8 are brackets to carry this track. 9 is a driving sprocket. 10, 11 and 12 are idler sprockets, there being four such sprockets on each side of the tank associated with the tracks on each side of the tank. 13 is a head shaft carrying the drive sprockets 9. 14 is a driven sprocket on the head shaft over which travels a drive chain 15 from a drive sprocket 16 driven by a motor 17. 18 is an endless chain, one traveling over each of the sprockets 9, 10, 11 and 12 and along each of the tracks 5 and 7. 19 is a pivoted scum collector or pipe adapted to be manually operated by means of a lever 20 to rotate the open slot 21 in the pipe so as to receive the scum brought to it by the scum scraper.

22 is a sludge conveyor flight. It is pivoted on a projection from the lower portion of the chain which travels along the track 5 and is associated with the sprockets 10 and 11. This conveyor flight extends clear across the tank and is adapted when in one position to travel along the floor of the tank being held in that position by the counterweight 23 stop 24 or floor of the tank as indicated in Figure 4. The lower flight when in conveying position could rest upon the floor and need not necessarily rest against stop 24 and be so held by counterweight 23. 24 is a stop limiting the movement of the counterweight and flight about their pivot in a counter-clockwise direction under the force of gravity applied through the counterweight 23. The flight is free to move from the position shown in Figure 4 to the position shown in Figure 5 where the flight rests against and travels along the underside of the track 5 being held also in that position by the counterweight 23.

Assuming, with reference to Figure 4, that the chain is traveling to the left with the flight in the position shown traveling along the floor of the tank toward the sludge hopper, the counterweight and stop 24 holds the flight in the sludge conveying position and continues so to do as the chain travels up about the sprocket 10 until as the pivot attachment approaches the 30 degree line where the collector travel is stopped, the change in angle of the chains as it travels around the sprocket will under the influence of gravity cause the counterweight to swing to the right hand side of the pivot from its original position on the left hand side when the counterweight will cause the flight to rotate until it rests against the curved portion of the track 5. When the chain travel starts back or reverses, the counterweight holds the flight in the feathering position along its entire excursion until the pivot attachment travels up around the sprocket 11, the angle of the chain bringing the counterweight back to the left hand side of the pivot when gravity will cause the counterweight to rotate the flight back to the conveying position. This cycle of operation continues indefinitely as long as the chain is caused to travel. The track 5 is curved also about the sprocket 11, and the bottom of the tank is upwardly curved as at 25 so that the force of gravity working through the counterweight tends to hold the flight against the bottom of the tank cleaning the corner as well as the floor.

The operation of the scum flight is somewhat similar. In this case, however, the flight 26 is above the track 7 and rests on the chain. 28 is a counterweight associated with the conveyor flight.

Starting with the parts in the position shown in full lines in Figure 2, the counterweight holds the flight in the upright position. As the chain moves to the left the flight projecting upwardly in conveying position above the liquid level 35 propels the scum toward the scum pipe and this continues until, as the pivot attachment travels around the sprocket 9, the center of gravity of flight and counterweight rotates to the left of the pivot point when the counterweight and flight rotates to the non-conveying position when the chain travel comes to a stop. Reversal of the chain travel causes the flight to be carried back to the feathering and non-conveying position as shown in the full lines in Figure 3 until as the chain travels over the sprocket 12 the center of gravity of counterweight and flight, owing to the change in angle of the chain moves from left hand to right hand side of the pivot point when the flight will be rotated to the conveying position so as to skim the surface of the liquid on the return travel.

These two flights, one above and one below, operated gravitally to move into and out of the conveying position are so disposed that as the chain moves back and forth, they convey only on travel toward the influent end of the tank, each flight feathering on its return travel. When the upper flight travels toward the influent end, the scum flight conveys, meanwhile the lower flight traveling away from the influent end and the sludge flight is feathering and doing no conveying. When the lower flight of chain travels toward the influent end, the scum flight is feathering while the sludge flight is conveying sludge.

29, 30 are limit switches having arms 31 and 32 projecting down into the path of the flight 26 so that at each end of the excursion, the lever is contacted by the flight to throw it over to stop and reverse the motor. If desired, there may be incorporated with these limit switches, a timing relay so that it would not be necessary to operate the machine continuously. It will be understood that the speeds at which the chain travels are very slow and there is no danger of the chain over-running after the power is cut off. But if that should happen, it can run a considerable distance without interfering with the operation because of the extent of the curved track 5 around both of the sprockets 10 and 11.

In the modified form of Figures 7, 8, 9 and 10, the flights are rotated by cams and the flights are thus not moved gravitally to the conveying position as is the case in the form of the device illustrated in Figures 2, 3, 4 and 5. Otherwise the structure of the modified form is the same as that above described.

The upper flight 26 which appears in several positions in Figures 7 and 8, is pivotally mounted on the chain 18 and is equipped with one or more arms 33 to the outer end of which is attached a cam contacting roller 34.

As shown in Figure 7 a cam member 35 is mounted adjacent the left hand end of the track 7. It is provided with a generally flat portion and with an upturned end 36 which is contacted by the roller 34, as shown in dotted lines at the left of Figure 7. At its opposite end the track 7 has mounted upon it, as shown in Figure 8, a second cam member 37 having an upturned end 38 which may be contacted by the roller 34.

As the chain 18 moves to the left in the direction of the arrow shown in Fig. 7, the roller 34 contacts the cam portion 36 as shown in dotted lines in that figure and as the movement of the chain to the left continues, the flight 26 is further rotated to the full line position of Figure 7 and finally it may overbalance by gravity.

As the chain moves to the right as indicated by the arrow in Figure 8, the roller 34 first contacts the cam portion 38 in the dotted line position of that figure. Further movement of the chain to the right causes rotation of the flight 26 to the full line position of Figure 8.

As shown in Figure 9 there is positioned upon the left hand end of the track 5, a cam support 39 carrying a cam 40 which terminates in a curved portion 41. As the chain 18 moves to the right as shown in Figure 9, the member 23 contacts the cam portion 41 and rotates the flight to the full line position of Figure 9.

Supported upon the left hand end of the track 5 by a cam support 42 is a cam 43. As the chain 18 moves to the right in the direction of the arrow as indicated in Figure 10, the member 23 runs up on the cam 43 and rotates the flight 22 to the full line position of Figure 10.

Thus by means of the cams shown in Figures 7, 8, 9 and 10 the upper and lower flights are moved into and out of conveying position and the result of the modified construction is generally the same as that of the construction shown in Figures 2, 3, 4 and 5, except that the rotation or movement of the flights into and out of conveying position is in the modified form accomplished wholly or largely by cams, while in the earlier shown form it is accomplished by gravity.

It will be understood, of course, that this mechanism and this arrangement might be used separately to handle sludge or scum, that it is not necessary to have the two types of scrapers in which case only one track and one pair of sprockets or turn members on the track would need to be used and the return flight could hang freely between the sprockets or if desired a larger sprocket could be used big enough to be tangent to both the upper and lower sprockets.

While I have shown but a single flight on the upper and lower limit of the chain obviously more flights might be used if that were desirable without any change in the operation or the control mechanism.

I claim:

1. In a sedimentation tank, an endless chain, a track near the top of the tank near the liquid level, a track near the bottom above the floor, turn members near the ends of said tracks, an endless chain traveling about said turn members and along said tracks, a conveyor flight pivoted on said chain adjacent the liquid level, means for driving the chain alternately in forward and reverse direction of travel and gravitally operated means for causing the flight to assume a conveying position with respect to the liquid level as the chain travels in one direction and to assume a non-conveying position as the chain travels in the opposite direction means for limiting the pivotal movement of the conveyor flights on the chain.

2. In a sedimentation tank, an endless chain, a track near the top of the tank near the liquid level, a track near the bottom above the floor, turn members near the ends of said tracks an endless chain traveling about said turn members and along said track, a conveyor flight pivoted on said chain, adjacent the tank floor, means for driving the chain alternately in forward and reverse directions of travel and gravitally operative means including a pivoted counterweight rigidly connected to the flight and means for displacing the center of gravity of the counterweight from one side to the other side of its pivot for causing the flight to assume a conveying position as the chain travels in one direction and to assume a non-conveying position as the chain travels in the opposite direction.

3. In a sedimentation tank, an endless chain, a track near the top of the tank near the liquid level, a track near the bottom above the floor, turn members near the ends of said tracks, an endless chain traveling about said turn members and along said tracks, conveyor flights pivoted on said chain, means for driving the chain alternately in forward and reverse direction of travel and gravitally operated means for causing the flight to assume a conveying position with respect to the tank floor as the chain travels in one direction and to assume a non-conveying position as the chain travels in the opposite direction and gravitally operated means for causing the flight associated with the upper track to assume a conveying position with respect to the liquid level as the chain travels in one direction and to assume a non-conveying position as the chain travels in the opposite direction and means for limiting the pivotal movement of the conveyor flights on the chain.

4. In a sedimentation tank, an endless chain, a track near the top of the tank near the liquid level, a track near the bottom above the floor, turn members near the ends of said tracks, an endless chain traveling about said turn members and along said tracks, conveyor flights pivoted on said chain, means for driving the chain alternately in forward and reverse direction of travel and gravitally operated means for causing the flight to assume a conveying position with respect to the tank floor as the chain travels in one direction and to assume a non-conveying position as the chain travels in the opposite direction and gravitally operated means for causing the flight associated with the other track to project above the liquid level as the chain travels in one direction and to be retracted below such level as the chain travels in the opposite direction, said means adapted to cause the upper flight to project above the liquid only when the lower flight is retracted away from the bottom of the tank and vise versa and means for limiting the pivotal movement of the conveyor flights on the chain.

5. In combination, a track, a chain, means for reciprocating the chain along the track first in one direction and then in the opposite direction, a conveyor flight pivoted on the chain and gravital means for causing rotation of the flight with respect to the chain, said means including a counterweight rigidly connected to the flight, and located on the opposite side of the pivot point thereof, and a turn member about which the chain is adapted to wrap carrying the pivoted flight with it at the end of its travel in different directions.

6. In a conveyor, a pivoted feathering flight, a counterweight adapted to actuate the flight, means for limiting the angular excursion of the flight between a position generally perpendicular and a position generally parallel with its line of travel, means for reciprocating the flight in a conveying position along a generally horizontal path, and means for guiding it at each end of its travel along paths increasingly inclined to the horizontal whereby the center of gravity of the counterweight with respect to the pivot axis of the flight is displaced to cause rotation of the flight under the influence of the counterweight.

7. In a conveyor, a pivoted feathering flight, a counterweight adapted to actuate it, means for reciprocating the flight in a direction perpendicular to its pivotal axis and means for changing the position of the counterweight with respect to the pivot axis of the flight at the opposite limits of flight travel means for limiting the angular excursion of the flight between a position generally perpendicular and a position generally parallel with its line of movement, whereby the force of gravity applied through the counterweight causes the flight to move from one position to the other.

8. In combination, a chain, means for reciprocating it along a substantially horizontal path and around oppositely curved paths at each end of the horizontal path, a conveyor flight pivoted on the chain, a counterweight associated with the flight, means for limiting the angular rotation of the counterweight and flight between positions where the flight is substantially parallel with and substantially perpendicular to the chain, the counterweight and flight being so positioned with respect to the chain that as the pivot axis travels along the curved path at each end of the horizontal path the center of gravity of the counterweight is displaced with respect to the pivot sufficiently to cause gravity to move the counterweight and flight from one position to the other.

9. In a sedimentation tank, an endless chain, a track near the top of the tank near the liquid level, a track near the bottom above the floor, turn members near the ends of said tracks, an endless chain traveling about said turn members and along said tracks, a conveyor flight pivoted on said chain, means for driving the chain alternately in a forward and a reverse direction of travel and mechanically operated means associated with the turn members for causing the flight to assume a conveying position as the chain travels in one direction and to assume a non-conveying position as the chain travels in the opposite direction.

10. In combination, a track, a chain, means for moving the chain along the track first in one direction and then in the opposite direction, a conveyor flight pivoted on the chain, and adapted to assume selectively a conveying and a feathering non-conveying position, means for changing the flight from the position in which it approaches the end of its excursion to the opposite position, as the flight approaches the end of its excursion, said means being operative to complete the change in position of the flight before the direction of movement of the chain is reversed.

11. In a conveyor, a pivoted feathering flight, means for reciprocating it, means for limiting its angular movement between a position generally perpendicular and a position generally parallel with its line of movement and mechanical means for moving the flight from one position to the other at each end of its excursion, said means being adapted to complete the movement of the flight from one position to the other before the reverse movement of the flight is commenced, said means being adapted to hold the flight in substantial parallelism with the chain as the chain moves in one direction and in substantial perpendicularity with the chain as it moves in the opposite direction, the position of the flight either horizontal or perpendicular being fixed and controlled by such mechanism and being invariable during operation.

12. Conveying means for settling tanks and the like comprising a blade supporting member, a blade assembly, comprising a blade and a counterweight, pivoted thereon, means for limiting its pivotal movement between conveying and non-conveying position, means for reciprocating the supporting member back and forth along a generally horizontal path, the blade being adapted to be held by the gravity effect of the counterweight in whichever of its two angular positions it may be as it travels along such path, means at each end of the horizontal path for guiding the supporting member along a curved path in prolongation thereof a distance sufficient to displace the center of gravity of the blade assembly from whichever side of the pivot it is on to the opposite side whereby the blade is moved from one position to the other and to thereafter return the conveying means back along the curved path and along the same horizontal path to the other end of its excursion.

13. In a sedimentation tank, a conveyor chain, conveyor flights pivoted thereon, means for imparting a longitudinal reciprocatory motion to the chain, means actuated by the force of gravity alone for rotating flights into and holding them in conveying position as the chain travels in one direction and means actuated by the force of gravity alone for rotating the flights into and holding them in non-conveying position as the chain travels in the opposite direction, the flight rotating means being adapted to complete the rotation of the flight at each end of the chain excursion before the chain commences its return movement.

14. In a sedimentation tank, a conveyor chain, conveyor flights pivoted thereon, automatic means for imparting a longitudinal reciprocatory motion to the chain, means actuated by the force of gravity alone for rotating flights into and holding them in conveying position as the chain travels in one direction and for rotating the flights into and holding them in non-conveying position as the chain travels in the opposite direction, said means including a counterweight associated with each conveyor flight and a guide at each end of the flight excursion about which the chain and flight travel.

15. In a sedimentation tank, a conveyor chain, conveyor flights pivoted thereon, automatic means for imparting a longitudinal reciprocatory motion to the chain, means actuated by the force of gravity alone for rotating flights into and holding them in conveying position as the chain travels in one direction and for rotating the flights into and holding them in non-conveying position as the chain travels in the opposite direction, said means including a counterweight associated with each conveyor flight and a guide at each end of the flight excursion about which the chain and flight travel, the guide being adapted to change the direction of movement of the chain and the relative position of chain flight and counterweight whereby the center of gravity of the combined flight and counterweight is shifted as the flight travels along the guide from one side to the other of the pivot point of the flight on the chain.

FRED E. MIICK.